United States Patent
Padberg et al.

(10) Patent No.: US 11,181,802 B2
(45) Date of Patent: Nov. 23, 2021

(54) PRODUCTION OF WAVEGUIDES MADE OF MATERIALS FROM THE KTP FAMILY

(71) Applicant: Universität Paderborn, Paderborn (DE)

(72) Inventors: Laura Padberg, Brilon (DE); Christof Eigner, Paderborn (DE); Matteo Santandrea, Paderborn (DE); Christine Silberhorn, Paderborn (DE)

(73) Assignee: UNIVERSITÄT PADERBORN, Paderborn (DE)

( * ) Notice: Subject to any disclaimer, the term of this patent is extended or adjusted under 35 U.S.C. 154(b) by 0 days.

(21) Appl. No.: 17/046,346

(22) PCT Filed: Apr. 9, 2019

(86) PCT No.: PCT/EP2019/059000
§ 371 (c)(1),
(2) Date: Oct. 9, 2020

(87) PCT Pub. No.: WO2019/197429
PCT Pub. Date: Oct. 17, 2019

(65) Prior Publication Data
US 2021/0033944 A1    Feb. 4, 2021

(30) Foreign Application Priority Data

Apr. 11, 2018  (DE) ...................... 10 2018 108 636.9

(51) Int. Cl.
G02F 1/355    (2006.01)
G02F 1/377    (2006.01)

(52) U.S. Cl.
CPC .......... *G02F 1/3558* (2013.01); *G02F 1/3775* (2013.01)

(58) Field of Classification Search
None
See application file for complete search history.

(56) References Cited

U.S. PATENT DOCUMENTS

| 7,011,705 B2 * | 3/2006 | Thomas | ................. C30B 17/00 117/68 |
| 2021/0033944 A1 * | 2/2021 | Padberg | ................. G02F 1/3775 |

FOREIGN PATENT DOCUMENTS

| JP | H06214277 | 8/1994 |
| WO | WO97/25648 A1 | 7/1997 |

OTHER PUBLICATIONS

PCT International Search Report and Written Opinion (w/ English translation) for corresponding PCT Application No. PCT/EP2019/059000, dated Jul. 9, 2019, 14 pages.
German Search Report (w/ English translation) for corresponding DE Application No. 10 2018 108 636.9dated Nov. 19, 2018—20 pages.
Shi et al., "Design and Fabrication of segmented waveguides in KTiPO4 substrates," Technical Digest. CLEO/Pacific Rim '99. Pacific Rim Conference on Lasers and Electro-Optics (Cat. No.99TH8464), pp. 1273-1274.
Opfermann et al., "He+ implantation for waveguide fabrication ion KTP and Rb:KTP," Nucl. Instr. and Methods in Phys. Research B 184 (1999), pp. 710-714.
Werner et al., "Integrated-optical amplitude modulator for high power applications," Optics Comm. 221(2003) pp. 9-12.
Liljestrand et al., "Ion-Exchange Inducted Coercive Field Gratings for QPM Devices in RB-doped KTP," 2016 Conference on Lasers and Electro-Optics (CLEO)—Jun. 5, 2016—OSA—2 pages.
Ruske et al., "Integrated-optical three-colour-mixing device," Electronics Letters vol. 34, No. 4, Feb. 19, 1998—2 pages.
Liljestrand et al., "Periodic poling of Rb-doped KTiPO_4 by coercive field engineering," Optics Express, vol. 24, No. 13, Jun. 27, 2016—8 pages.
Volk et al., "Fabrication of ridge waveguides in potassium titanyl phosphate (KTP) for nonlinear frequency conversion," Proceedings of Spie, vol. 10516, (Feb. 15, 2018), p. 105161A1-105161A-7.
Risk et al., "Periodic electric field poling of KTiOPO4 using chemical patterning," Applied Physics Letters, AIP Publishing LLC, US, vol. 69 No. 26, (Dec. 23, 1996), pp. 3999-4001.

* cited by examiner

Primary Examiner — Rhonda S Peace
(74) Attorney, Agent, or Firm — Dority & Manning, P.A.

(57) ABSTRACT

The invention relates to a method for producing waveguides (201) from a material (202) of the KTP family comprising the following method steps:

Figure 1:
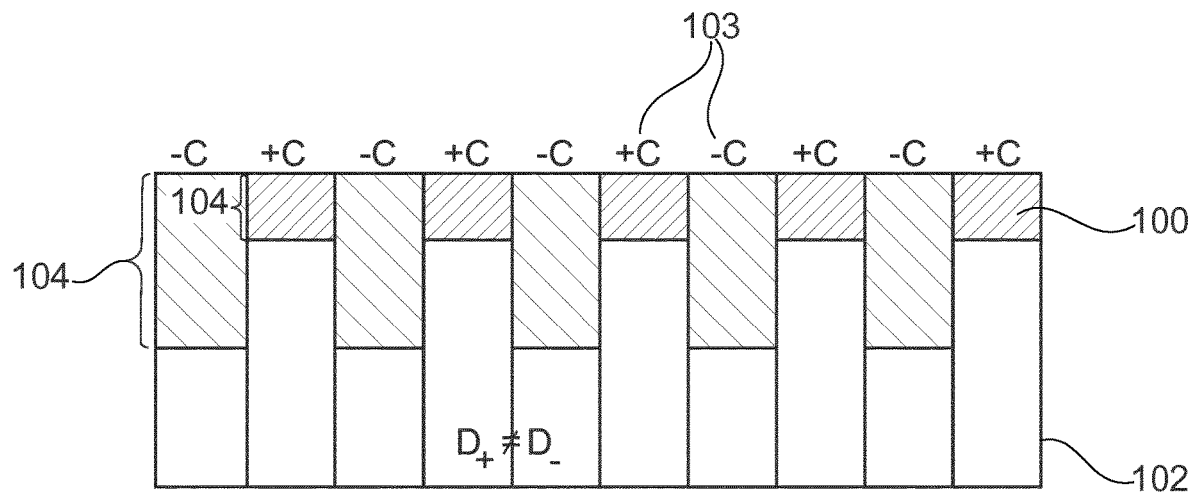

b) treating the material (202) in such a way that a periodic poling of the material (202) is achieved, c) treating the material (202) in a molten salt bath (309c), which contains rubidium ions, characterized in that the molten salt bath (309c) which contains rubidium ions in step c) satisfies the following boundary conditions:

the mole fraction of rubidium nitrate ($RbNO_3$) in the melt lies in the range of 86-90 mol % at the beginning of the treatment, the mole fraction of potassium nitrate ($KNO_3$) in the melt lies in the range of 10-12 mol % at the beginning of the treatment, the mole fraction of barium nitrate ($Ba(NO_3)_2$) in the melt lies in the range of 0.5-1 mol % at the beginning of the treatment, the temperature of the melt lies in the range of 357-363° C. during the treatment.

Thus the problem is solved, when reversing the known method steps, of achieving substantially identical diffusion depths of the ions during the ion exchange in order to produce periodically poled waveguides as free of corrugation as possible.

8 Claims, 3 Drawing Sheets

PRODUCTION OF WAVEGUIDES MADE OF MATERIALS FROM THE KTP FAMILY

PRIORITY CLAIM

The present application is a 371 of International Application No. PCT/EP2019/059000, titled "PRODUCTION OF WAVEGUIDES MADE OF MATERIALS FROM THE KTP FAMILY," filed on Apr. 9, 2019, which claims the benefit of priority of DE Patent Application Serial No. 10 2018 108 636.9 filed on Apr. 11, 2018, which are incorporated herein in its entirety by reference.

The invention relates to a method for producing waveguides made of materials from the KTP family.

Periodically poled waveguides made of non-linear materials are used for non-linear optical effects, which include, among others, frequency doubling (SHG), sum frequency generation (SFG), and difference frequency generation (DFG). Thus, non-linear optics are used in the construction of optical switches and components. Lasers are only available in limited wavelength ranges. New wavelengths (ranges) may be achieved by means of frequency conversion in non-linear optical components. Non-linear materials, which have a high destruction limit and a broad transparency range, are indispensable for efficient frequency conversion. Materials made from potassium titanyl phosphate (KTP) have these properties, so that they are especially suited for the production of non-linear components, like periodically poled waveguides. The KTP family includes all $MTiOXO_4$ materials, where $M=\{K,Rb,Cs\}$ and $X=\{P,As\}$.

Methods for producing periodically poled waveguides made from potassium titanyl phosphate (KTP) and other isomorphic structures from the KTP family are known, and may include, among others, a treatment of the material in a molten salt bath with rubidium ions in order to carry out an ion exchange. Subsequently to this, a periodic inversion of the crystal domains may be carried out by applying an electric field, by which means the waveguide is periodically poled. Such a method is described, for example, in EP 1 015 936 B1 and WO 1990/004807 A1.

The method steps known from the prior art for producing periodically poled waveguides made from KTP thus include, among others, the production of the waveguide by ion exchange, wherein potassium ions of the material are exchanged for rubidium ions, and a subsequent periodic poling of the waveguide. A reversal of these two method steps, the ion exchange and the periodic poling, has the advantage that a better poling may be carried out, which leads to an increase in the efficiency of the conversion process. However, the reversal of the method steps in the conventional method generally leads to corrugation in the waveguide, as the differently-poled areas of the material have different diffusion coefficients, so that the ions diffuse into the material at different depths during the subsequent ion exchange process. Corrugation of the waveguide means that the waveguide has different penetration depths along the propagation direction of the light, so that phase adaption conditions for the conversion change, by which means the efficiency of the conversion process is impaired and the waveguides have higher losses.

Arising from this, it is the object of the invention to achieve, when reversing the known method steps, substantially identical diffusion depths of the ions during the ion exchange in order to produce a periodically poled waveguide as free of corrugation as possible.

This problem is solved by the subject matter of patent claim 1. Preferred refinements are given in the subclaims.

Thus, a method according to the invention for producing waveguides from a material of the KTP family is provided comprising the following method steps:
b) treating the material in such a way that a periodic poling of the material is achieved,
c) treating the material in a molten salt bath which contains rubidium ions,
characterized in that the molten salt bath, which contains rubidium ions in step c), satisfies the following boundary conditions:
the mole fraction of rubidium nitrate ($RbNO_3$) in the melt lies in the range of 86-90 mol % at the beginning of the treatment,
the mole fraction of potassium nitrate ($KNO_3$) in the melt lies in the range of 10-12 mol % at the beginning of the treatment,
the mole fraction of barium nitrate ($Ba(NO_3)_2$) in the melt lies in the range of 0.5-1 mol % at the beginning of the treatment,
the temperature of the melt lies in the range of 357-363° C. during the treatment.

In this way, it may be achieved that the diffusion coefficient of the rubidium ions is independent of the periodic poling of the material. The selection of the boundary conditions for the molten salt bath containing rubidium ions leads to waveguides that are substantially free of corrugations. The diffusion coefficient depends on the temperature and on which material is diffused into which other material, and on the composition of the molten salt bath. The selection according to the invention of the exchange parameters in the ion exchange leads to substantially identically large diffusion coefficients for the differently poled areas of the material.

Thus, a method according to the invention is provided for producing waveguides, which leads to waveguides that are substantially free of corrugation. The method thereby provides two method steps b) and c). The treatment in step b) leads to a periodic inversion of the crystal domains. This technique enables quasi-phase matching (QPM), by which means frequency conversion is enabled within the entire transparent area.

Using the subsequent treatment in step c), a waveguide is created in a molten salt bath which contains rubidium ions. An ion exchange takes place here, wherein rubidium ions from the melt occupy the lattice sites of the potassium ions in the material. By this means, the refractive index is increased, which enables waveguiding. The differently-poled areas of the material have different diffusion coefficients for the ion exchange process. By using the method, it is ensured that the ions in the differently-poled areas diffuse into the material at substantially identical depths and a waveguide is generated as free of corrugation as possible. By this means, in that the periodic poling is carried out before the ion exchange process, an improved poling may be achieved, which leads to an increase of the efficiency of the conversion process and to waveguides with lower losses.

The sequence of the method steps may basically be selected so that the treatment in the molten salt bath is carried out before the periodic poling. According to one preferred refinement of the invention, however, the two method steps are to be carried out in the following sequence: b) treatment of the material in such a way that a periodic poling of the material is achieved, and c) treatment in a molten salt bath. By maintaining the sequence b), c), an improved poling is achieved, which leads to an increase in the efficiency of the conversion process and to waveguides with lower losses.

According to one preferred refinement of the invention, the method includes an upstream step a) of the preparatory treatment of the material, in order to homogenize and/or to reduce the conductivity of the material. The preparatory treatment has the goal of reducing and/or homogenizing the conductivity of the material. By this means, carrying out the periodic poling in step b) is simplified, because an increased conductivity makes it more difficult to maintain a sufficient voltage between two electrodes applied on mutually opposing sides of the material sample.

The treatment, with the goal of homogenizing and/or reducing the conductivity of the material, preferably includes a treatment of the material in a $KNO_3$ melt. Due to this method step, the vacancies in the material are occupied by potassium ions. By this means, the conductivity of the material is homogenized and/or reduced. This leads to a simplification of the periodic poling carried out later, because an increased conductivity makes it more difficult to maintain a sufficient voltage between two electrodes. One preferred refinement of the invention provides a temperature of the $KNO_3$ melt of 375° C. for at least 24 hours.

A periodic poling may basically be achieved through various methods, which are known to the person skilled in the art and are part of the prior art (see, e.g., EP 1 015 936 B1). According to one preferred refinement of the invention, however, it is provided that the treatment step, which leads to a periodic poling, is carried out by using a pulsed electric field between two electrodes applied on mutually opposing sides of the material sample. For this purpose, a periodically shaped electrode is preferably used on the one side of the material sample. This ensures that the domains in the material are periodically inverted. Due to the periodic poling, the non-linearity present in the material is modulated, in order to thus compensate for the phase difference between the propagating light beams and to achieve constructive interference. This leads to increased efficiencies during the conversion process.

According to one preferred refinement of the invention, it is provided that the treatment in a molten salt bath which contains rubidium ions in step c) is used only on one side of the material sample, and this is carried out with respect to the surface in a strip-like way. For this purpose, a strip-like mask is used on the one side of the material sample, preferably perpendicular to the poling structure. This ensures that only the selected strip-like areas of the material come into contact with the molten salt bath. An ion exchange with the melt only occurs in these areas. The diffusion of the rubidium ions from the melt into the material leads to an increase in the refractive index in the corresponding areas, which enables a waveguide.

The invention is described below in greater detail on the basis of a preferred embodiment with reference to the drawings.

Figure 2:
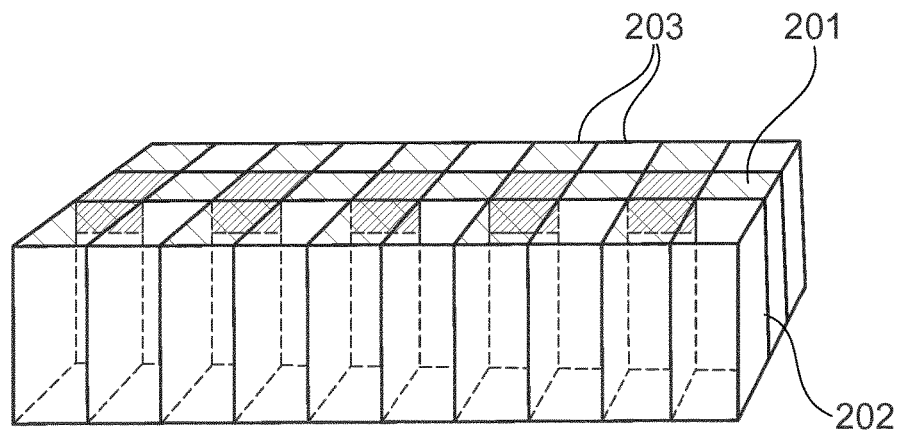
Figure 2:
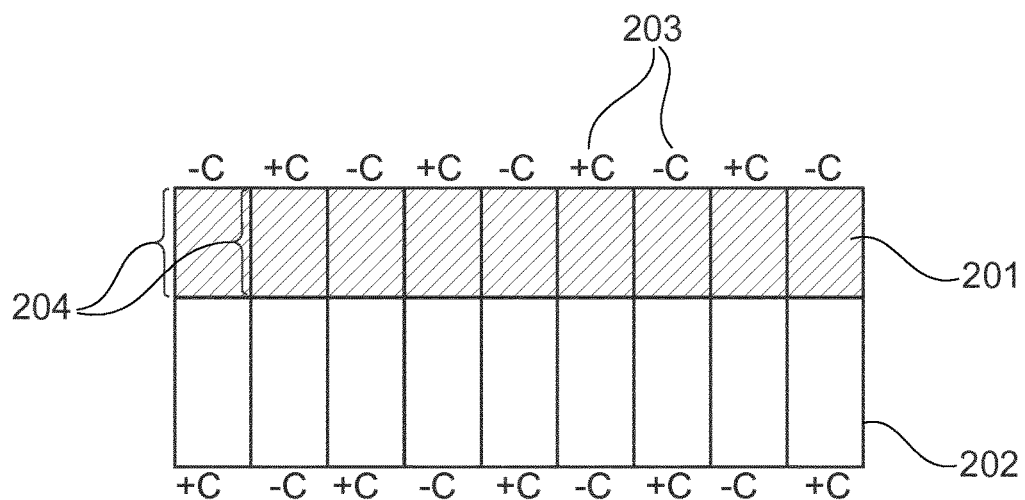
Figure 3:
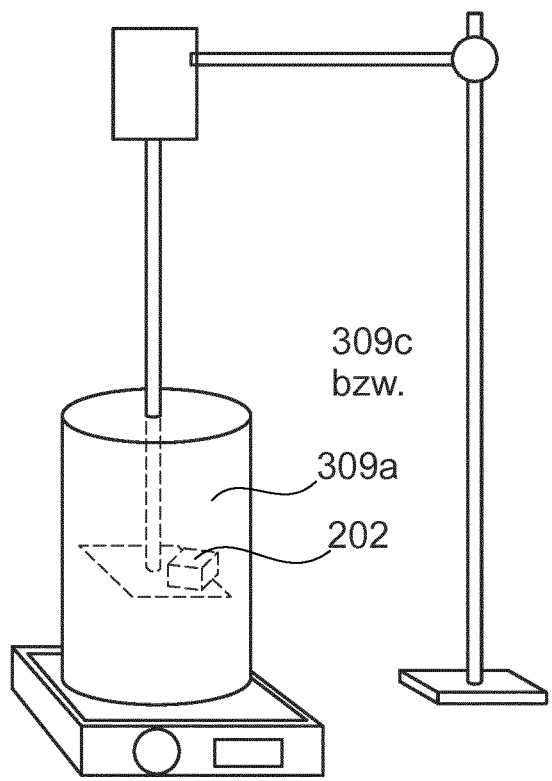
Figure 4:
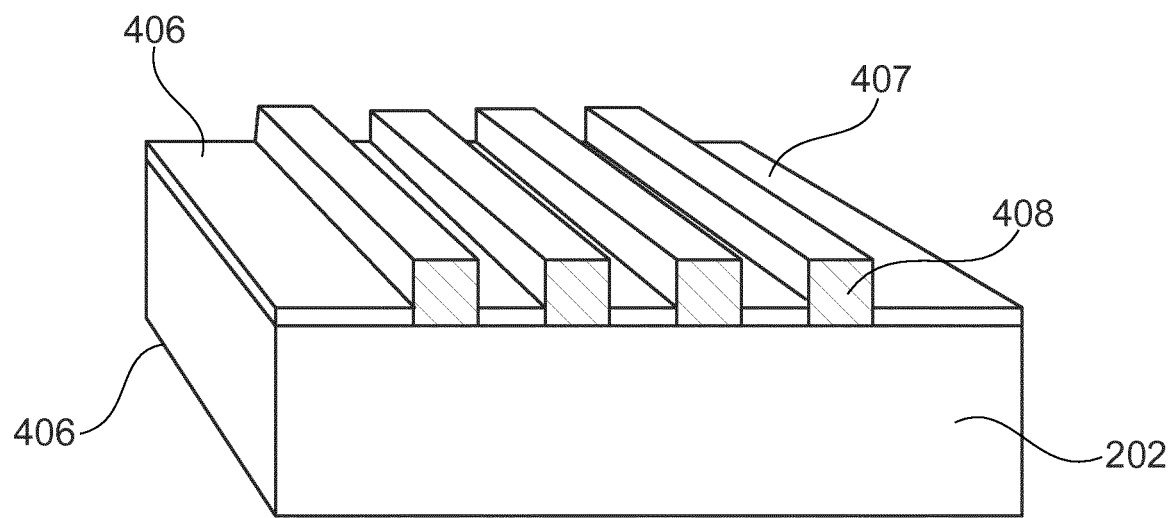
Figure 5:
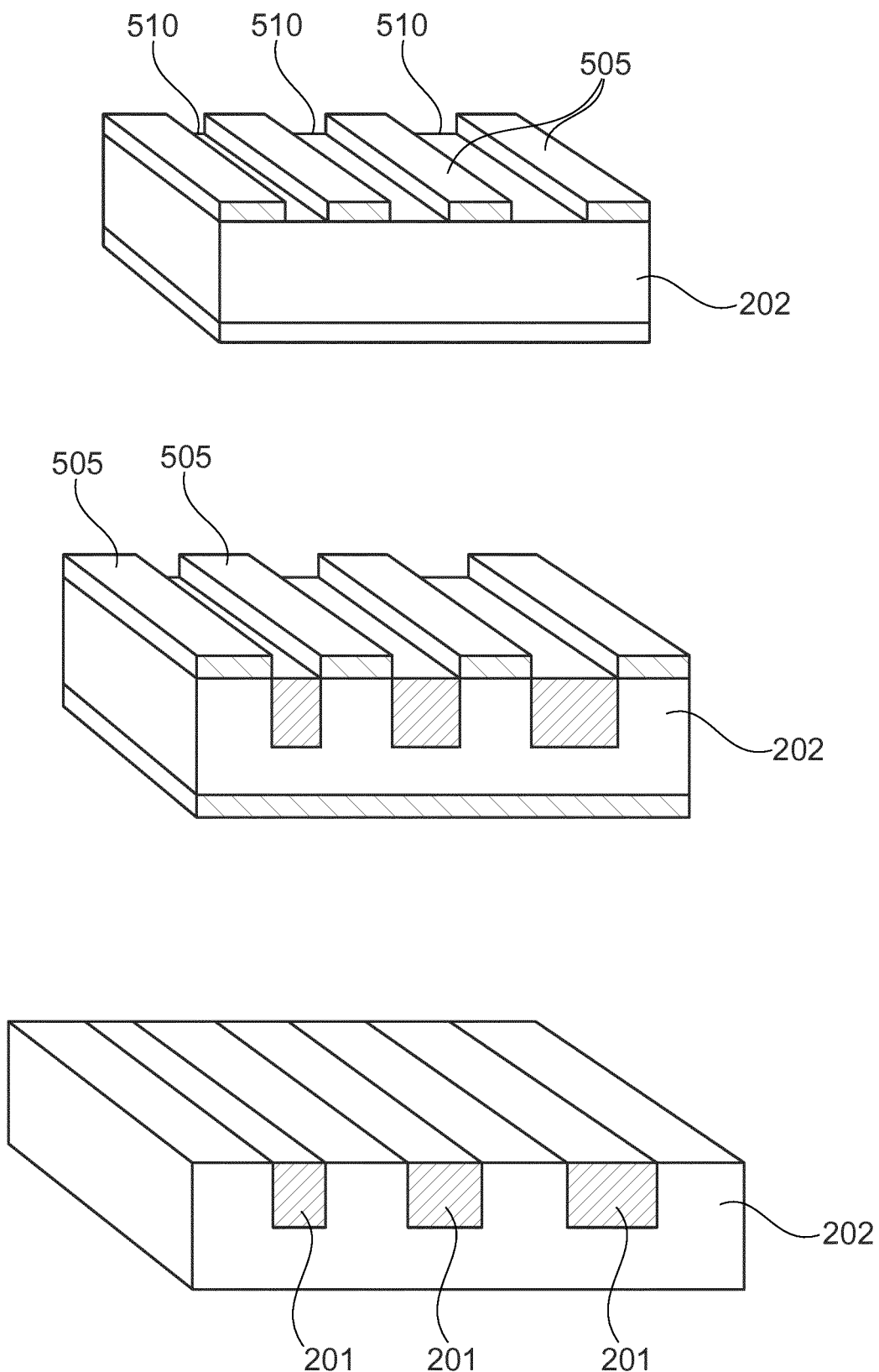

As shown in the drawing,

FIG. 1 a conventional, corrugated, periodically poled waveguide,

FIG. 2 a periodically poled waveguide free of corrugation according to one preferred embodiment of the invention, FIG. 3 a structure for the treatment in steps a and c according to one preferred embodiment of the invention, FIG. 4 the electrodes which are used for the step of the periodic poling, and FIG. 5 the effect of step c on the material sample in a schematic depiction.

FIG. 1 shows a longitudinal section through a conventional, corrugated periodically poled waveguide 100 in a schematic representation. A production of the waveguide made from a KTP material sample 102 through ion exchange after the periodic poling generally leads to a corrugated waveguide 100. The differently poled (−c, +c) areas 103 have differently large diffusion coefficients ($D_+ \neq D_-$). Due to this, the ions diffuse into the material at different depths during the ion exchange, depicted by means of diffusion depth 104. A corrugation of waveguide 100 leads to impairment in the efficiency of the conversion process.

FIG. 2 schematically shows a perspective depiction and a longitudinal section through a periodically poled waveguide 201 without corrugation made from a KTP material sample 202 by producing the waveguide through an ion exchange after the periodic poling according to a method according to one preferred embodiment of the invention. The diffusion coefficient depends on the temperature and on which material is diffused into which other material. The selection of the exchange parameters in the ion exchange leads to substantially identically large diffusion coefficients and thus to substantially identically deep diffusion depths 204 for differently poled areas 203 of material 202.

The presently described preferred embodiment of the method provides three method steps. In the first step a), a preparatory treatment is carried out with the goal of homogenizing and/or reducing the conductivity of the material. A treatment of the material thereby takes place in a $KNO_3$ melt 309a. FIG. 3 schematically shows the structure for this step. The temperature of $KNO_3$ melt 309a thereby lies at 375° C. in the present embodiment. The residence time of material sample 202 in the melt is thereby 24 h.

In the second step b), a periodic poling of the material occurs. FIG. 4 shows electrodes 406, which are used for the step of periodic poling, in a schematic depiction. A periodically-shaped electrode 407, which is manufactured according to known techniques, is located on one side of material sample 202. An area of insulating material 408 delimits in each case the area of periodically-shaped electrode 407, which directly contacts the material. By generating a pulsed electric field, the domains are able to be inverted, which leads to a periodic poling.

The structure for third step c) is analogous to that of step a) and is schematically shown in FIG. 3. In third step c), a treatment of material 202 takes place in a molten salt bath 309c, which contains rubidium ions. This leads to an ion exchange between the rubidium ions in the melt and the potassium ions in the material, due to which the refractive index changes.

FIG. 5 shows the effect of third step c) on material sample 202 in a schematic representation. Waveguides 201 are produced only in certain areas 510 of material 202. For this purpose, a strip-shaped mask 505, which was manufactured according to known techniques, is used on one side of material sample 202. Mask 505 ensures that only selected strip-like areas 510 of material 202 come into contact with the molten salt bath. The other side is completely shielded from the molten salt bath. Only in areas 510, which are not covered by the mask, does an ion exchange with the melt take place.

Melt 309c, which contains rubidium ions, comprises, according to the previously described preferred embodiment of the invention, a mixture of rubidium nitrate, potassium nitrate, and barium nitrate, and is composed as follows:

the mole fraction of rubidium nitrate ($RbNO_3$) in the melt lies at 88 mol % at the beginning of the treatment, the mole fraction of potassium nitrate ($KNO_3$) in the melt lies at 11 mol % at the beginning of the treatment, and jhthe mole fraction of barium nitrate ($Ba(NO_3)_2$) in the melt lies at 1 mol % at the beginning of the treatment. The temperature of the melt during the treatment is 360° C.

Periodically poled waveguides 201 substantially free of corrugation are thus collectively achieved.

LIST OF REFERENCE NUMERALS

100 Corrugated, periodically poled waveguide
102 KTP material sample
103 Areas of poling
104 Diffusion depth
201 Periodically poled waveguide free of corrugation
202 KTP material sample
203 Areas of poling
204 Diffusion depth
309a Molten salt bath $KNO_3$
309c Molten salt bath and its mixture made from $RbNO_3$, $KNO_3$ and $Ba(NO_3)_2$
406 Electrodes
407 Periodically-shaped electrode
408 Area made from insulating material
505 Strip-shaped mask
510 Strip-shaped areas

The invention claimed is:

1. Method for producing waveguides from a material of the KTP family comprising:
   b) treating the material in such a way that a periodic poling of the material is achieved,
   c) treating the material in a molten salt bath, which contains rubidium ions,
   characterized in that the molten salt bath which contains rubidium ions in c) satisfies the following boundary conditions:
   the mole fraction of rubidium nitrate (RbNO3) in the melt lies in the range of 86-90 mol % at the beginning of the treatment,
   the mole fraction of potassium nitrate (KNO3) in the melt lies in the range of 10-12 mol % at the beginning of the treatment,
   the mole fraction of barium nitrate (Ba(NO3)2) in the melt lies in the range of 0.5-1 mol % at the beginning of the treatment,
   the temperature of the melt lies in the range of 357-363° C. during the treatment.

2. Method according to claim 1, characterized in that the method is carried out in the sequence b), c).

3. Method according to claim 1, characterized in that the method has an upstream a) preparatory treating the material, in order to homogenize or to reduce the conductivity of the material.

4. Method according to claim 3, characterized in that the preparatory treatment includes a treatment of the material in a KNO3 melt.

5. Method according to claim 1, characterized in that the treatment, which leads to a periodic poling, includes a use of a pulsed electric field between two electrodes, which are applied on mutually opposite sides of the material sample.

6. Method according to claim 5, characterized in that a periodically-shaped electrode is thereby used on one side of the material sample.

7. Method according to claim 1, characterized in that the treatment in the molten salt bath, which contains the rubidium ions, in c) is used only on one side of the material sample, and this is carried out with respect to the surface in a strip-like way.

8. Method according to claim 7, characterized in that a strip-shaped mask is thereby used on one side of the material sample.

\* \* \* \* \*